US008960453B2

(12) United States Patent
Chang

(10) Patent No.: US 8,960,453 B2
(45) Date of Patent: Feb. 24, 2015

(54) HANGING DEVICE FOR A PINCER

(71) Applicant: Chi-Tsai Chang, Taichung (TW)

(72) Inventor: Chi-Tsai Chang, Taichung (TW)

(*) Notice: Subject to any disclaimer, the term of this patent is extended or adjusted under 35 U.S.C. 154(b) by 5 days.

(21) Appl. No.: 13/871,473

(22) Filed: Apr. 26, 2013

(65) Prior Publication Data

US 2013/0320174 A1 Dec. 5, 2013

(30) Foreign Application Priority Data

Jun. 5, 2012 (TW) ............................. 101210818 U

(51) Int. Cl.

*A47F 7/00* (2006.01)
*F16M 13/00* (2006.01)
*A45C 11/26* (2006.01)
*B65D 73/00* (2006.01)

(52) U.S. Cl.

CPC ........... *F16M 13/00* (2013.01); *B65D 73/0014* (2013.01)
USPC ........................... 211/70.6; 206/349; 206/495

(58) Field of Classification Search

CPC .................................. B25H 3/006; B25H 3/04
USPC .................................. 211/70.6; 206/349, 495
See application file for complete search history.

(56) References Cited

U.S. PATENT DOCUMENTS 2,068,308 A * 1/1937 Zerver .......................... 206/376
4,271,732 A * 6/1981 Vaughan, Jr. ................... 81/414
4,650,074 A * 3/1987 Vosbikian ..................... 206/477
4,726,265 A * 2/1988 Reich .............................. 81/411
4,872,551 A * 10/1989 Theros .......................... 206/349
5,291,810 A * 3/1994 Lins ................................ 81/414
5,335,772 A * 8/1994 Chervenak et al. ........... 206/349
5,435,447 A * 7/1995 Weatherford et al. ........ 206/349
5,595,295 A * 1/1997 Lin ................................ 206/349
5,819,932 A * 10/1998 Norbits ......................... 206/349
5,906,350 A * 5/1999 Kao ............................... 248/688
5,996,817 A * 12/1999 Kao ............................. 211/70.6
6,098,508 A * 8/2000 Battistone ........................ 81/416
6,164,463 A * 12/2000 Lee ............................. 211/70.6
6,241,208 B1 * 6/2001 Lin ............................ 248/309.1
6,375,005 B1 * 4/2002 McCann ........................ 206/349
6,679,379 B1 * 1/2004 Kao ............................... 206/349
6,732,989 B1 * 5/2004 Kao ........................... 248/309.1
6,837,373 B2 * 1/2005 Huang ........................... 206/376
6,874,630 B2 * 4/2005 Lin Wu .......................... 206/349
6,892,609 B2 * 5/2005 Kuo ................................ 81/413

(Continued)

FOREIGN PATENT DOCUMENTS

TW 437551 5/2001

*Primary Examiner* — Jonathan Liu
*Assistant Examiner* — Devin Barnett
(74) *Attorney, Agent, or Firm* — Muncy, Geissler, Olds & Lowe, P.C.

(57) ABSTRACT

A hanging device is used to hang a pincer body which is displayed. The pincer body includes a first clamp body and a second clamp body The first clamp body has an adjusting opening. The hanging device includes a hanging member having a hanging hole, a positioning member having a base and a positioning portion, the base having a top portion and a bottom portion, the bottom portion of the base assembled to the hanging member, and a width of the positioning portion being longer than a width of the base and a width of the adjusting opening of the first clamp body. When the base is inserted into the adjusting opening, the positioning portion is assembled to a top of the base so that the first clamp body is locked between the positioning portion and the hanging member.

5 Claims, 7 Drawing Sheets

(56) References Cited

U.S. PATENT DOCUMENTS

| | | | | | |
|---|---|---|---|---|---|
| D511,976 | S * | 11/2005 | Budrow | D9/715 |
| 7,131,535 | B2 * | 11/2006 | Hernandez et al. | 206/349 |
| 7,428,969 | B2 * | 9/2008 | Wu | 206/349 |
| 7,648,029 | B2 * | 1/2010 | Chen | 206/376 |
| 7,753,216 | B2 * | 7/2010 | Kao | 211/70.6 |
| 7,931,158 | B1 * | 4/2011 | Wu | 211/70.6 |
| 8,276,751 | B2 * | 10/2012 | Zorc | 206/349 |
| 8,281,925 | B2 * | 10/2012 | Chang | 206/378 |
| 8,381,920 | B2 * | 2/2013 | Chang | 211/70.6 |
| 8,661,948 | B2 * | 3/2014 | DeBaker et al. | 81/405 |
| 2004/0035731 | A1 * | 2/2004 | Lee | 206/349 |
| 2004/0173486 | A1 * | 9/2004 | Lin Wu | 206/349 |
| 2005/0035013 | A1 * | 2/2005 | Bates et al. | 206/349 |
| 2005/0061757 | A1 * | 3/2005 | Chiang | 211/70.6 |
| 2005/0173279 | A1 * | 8/2005 | Chen | 206/372 |
| 2006/0086636 | A1 * | 4/2006 | Kuo | 206/495 |
| 2007/0007156 | A1 * | 1/2007 | Wu | 206/376 |
| 2007/0102382 | A1 * | 5/2007 | Tuan Mu | 211/70.6 |
| 2008/0302743 | A1 * | 12/2008 | Chen | 211/70.6 |
| 2009/0026105 | A1 * | 1/2009 | Wu | 206/495 |
| 2010/0089787 | A1 * | 4/2010 | Trapp | 206/477 |
| 2012/0091082 | A1 * | 4/2012 | Chang | 211/70.6 |
| 2013/0056375 | A1 * | 3/2013 | Albrecht et al. | 206/349 |
| 2013/0153521 | A1 * | 6/2013 | Kao | 211/70.6 |

* cited by examiner

HANGING DEVICE FOR A PINCER

BACKGROUND OF THE INVENTION

1. Field of the Invention

The present invention relates to a hanging device for a pincer.

2. Description of the Prior Art

When a user selects a pincer in a hardware store, the user always wants to try an operation feel; therefore, a conventional hanging device for a pincer comes to the world. The pincer is exposed from the conventional hanging device, so that the user can try the operation feel of the pincer. Furthermore, the conventional hanging device for a pincer further has a burglarproof function (as shown in patent TW437551) so as to prevent the pincer from being stolen by a thief.

However, there are two disadvantages of the conventional hanging device for a pincer, shown as following.

First, when the pincer is assembled onto the conventional hanging device for a pincer, the user cannot further adjust a clamping space of the pincer, because a first clamp body and a second clamp body of the pincer are both locked on the conventional hanging device for a pincer.

Second, a structure of the conventional hanging device for a pincer is too completed to cost down; moreover, the conventional hanging device for a pincer occupies a large space and is difficult to assemble.

The present invention is, therefore, arisen to obviate or at least mitigate the above mentioned disadvantages.

SUMMARY OF THE INVENTION

An object of the present invention is to provide an improved hanging device. To achieve the above and other objects, a hanging device is used to hang a pincer body which is displayed; the pincer body comprises a first clamp body and a second clamp body; the first clamp body has an adjusting opening opened thereon; the first clamp body is slidably pivoted to the second clamp body via a connector controllably slidably disposed through the adjusting opening the hanging device comprises a hanging member having a hanging hole, a positioning member having a base and a positioning portion, the base having a top portion and a bottom portion, the bottom portion of the base assembled to the hanging member, and a width of the positioning portion being longer than a width of the base and being longer than a width of the adjusting opening of the first clamp body. Wherein, the positioning portion has a straight part and a head part; the straight part is extended parallelly with the base; the head part is defined at one end of the straight part; the adjusting opening has a plurality of curved portions and a straight portion; the curved portions are aligned in a row; a distance is defined between each two adjacent curved portions; the straight portion passing through a center of each curved portion; the head part of the positioning portion is round-shaped; the head part has a center which is connected to one end of the straight part; a width of the straight part of the positioning portion is longer than a width of the straight portion of the adjusting opening; a width of the head part is longer than a width of the curved portions of the adjusting opening; the base has a main part and a curved part; the main part of the base is inserted into the straight portion of the adjusting opening, and the curved part of the base is inserted into one curved portion; the straight part of the positioning portion is assembled to the top portion of the main part; a width of the straight part of the positioning portion is longer than a width of the main part of the base; the head part of the positioning portion is assembled at a top of the curved part of the base; a shape of the head part corresponds to the curved part; a width of the head part is longer than a width of the curved part of the base; the adjusting opening has a plurality of round portions; the round portions are strung and communicate with each other; a width of a straight part of a positioning portion is longer than a width of each stringing site of each two adjacent round portions; a head part of the positioning portion is round-shaped; a width of the head part of the positioning portion is longer than a diameter of each round portion; the hanging member has a through hole opened thereon; a positioning block is extruded from the bottom portion of the base; the positioning block passes through the through hole and is engaged with the hanging member; the positioning block has an extruded part and a smooth part; the smooth part is assembled in the through hole and the extruded part is exposed from the rear side of the hanging member; the hanging member has an extruded ring; the extruded ring encloses the through hole; the extruded ring extruded form the rear side of the hanging member; the extruded part defines an exposure distance form the rear side of the hanging member; the extruded ring defines an extrusion distance form the rear side of the hanging member; the extrusion distance of the extruded ring is longer than the exposure distance of the extruded part, or is equal to the exposure distance of the extruded part; the hanging member has two rods extended therefrom; the two rods of the hanging member are both inserted into the positioning member; the two rods of the hanging member has an extruded portion and a smooth portion; the positioning member has two through openings; the two through openings are both opened from the base to the positioning portion therethrough; the smooth portion of each rod is inserted into each corresponding through opening and the extruded portion of each rod passes through each corresponding through opening; the extruded portion of each rod is exposed from the positioning portion and is engaged with a top surface of the positioning portion; the hanging member has a sliding hole opened thereon; the pincer body comprises a connector; the connector passes through the second clamp body, the adjusting opening of the first clamp body and the sliding hole, and is slidable along the adjusting opening the sliding hole, so that the second clamp body is movable relative to the first clamp body. Under this arrangement, when the base is inserted into the adjusting opening of the first clamp body, the positioning portion is assembled to a top of the base so that the first clamp body is locked between the positioning portion and the hanging member, and the first clamp body is controllably slidable relative to the second clamp body via movement of the connector along the adjusting opening and pivotable.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
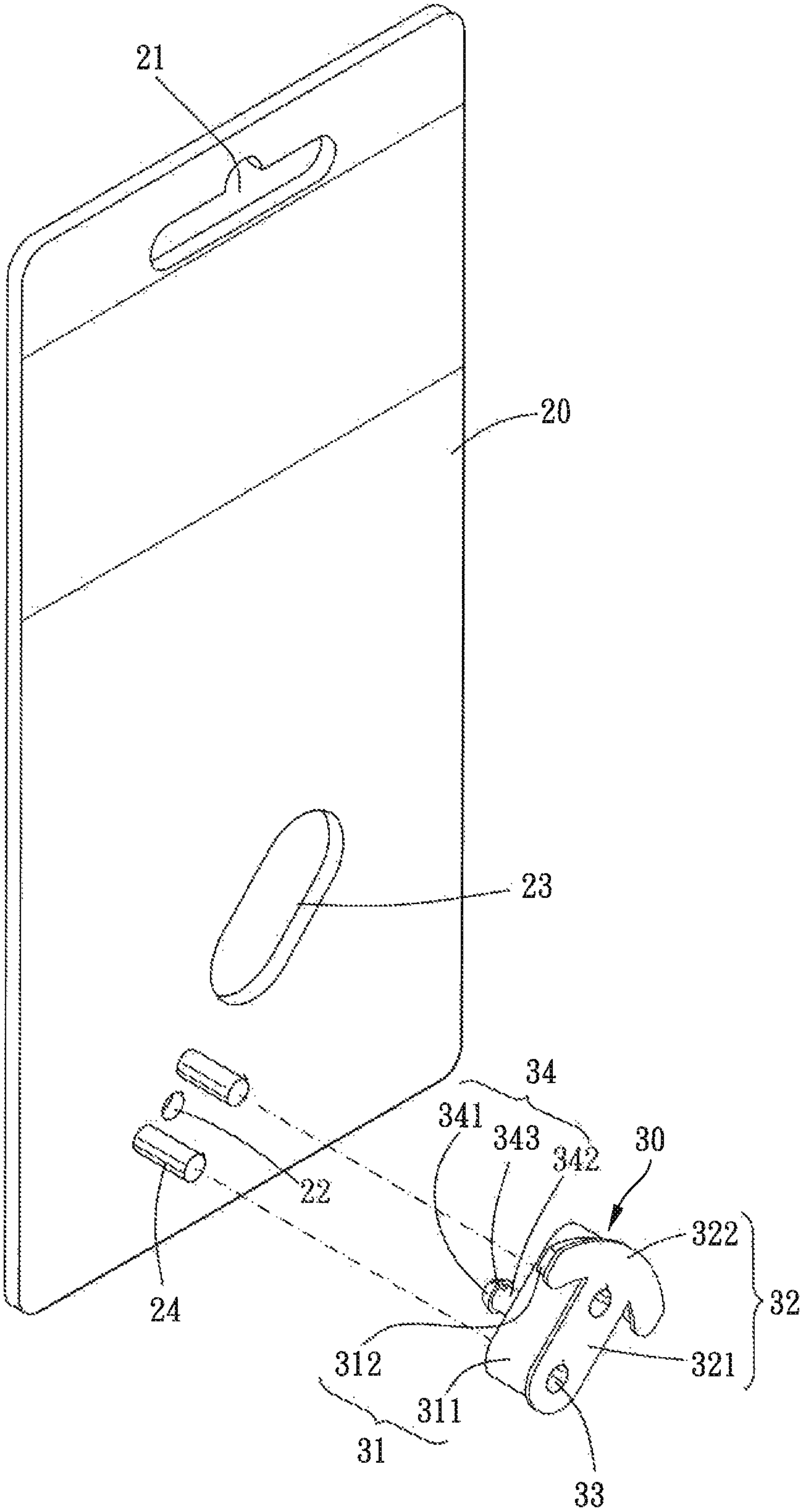
FIG. 1 is an exploded view of a first embodiment of the present invention.
Figure 2:
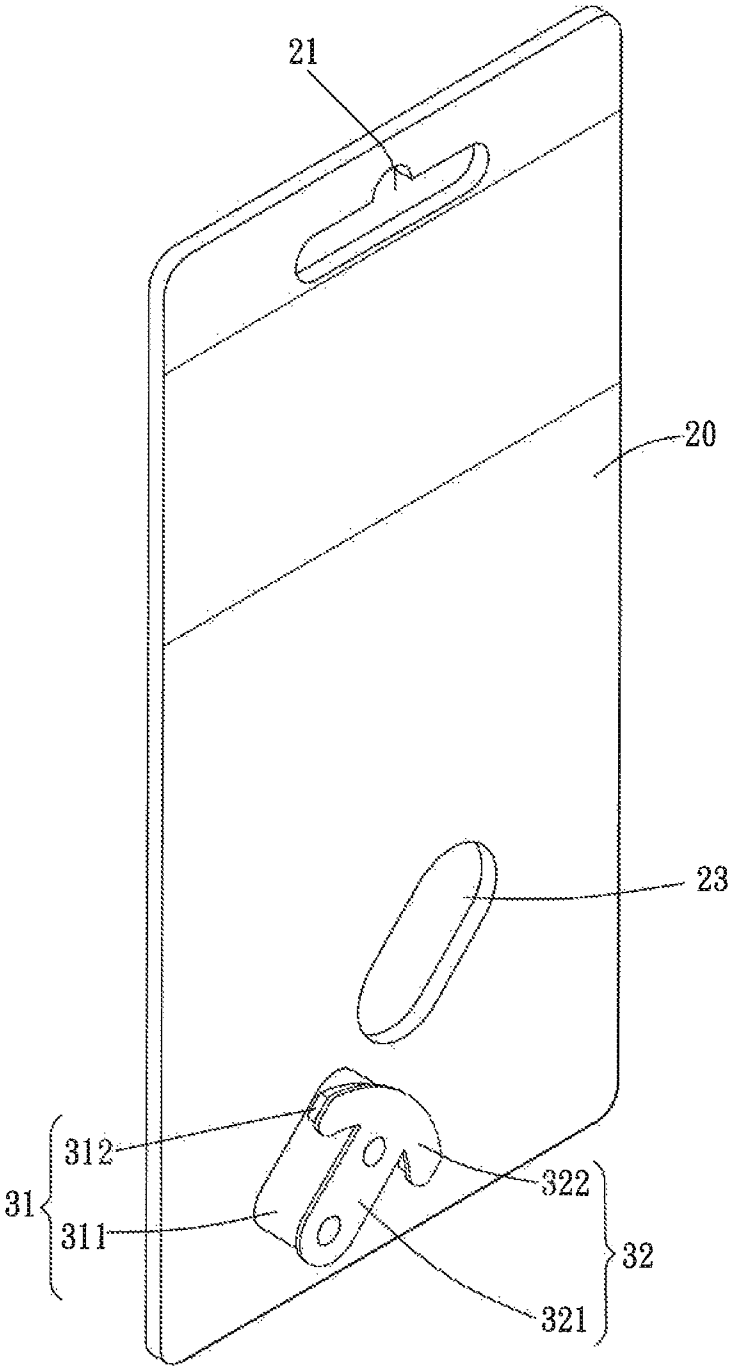
FIG. 2 is a perspective view of the first embodiment of the present invention.
Figure 3:
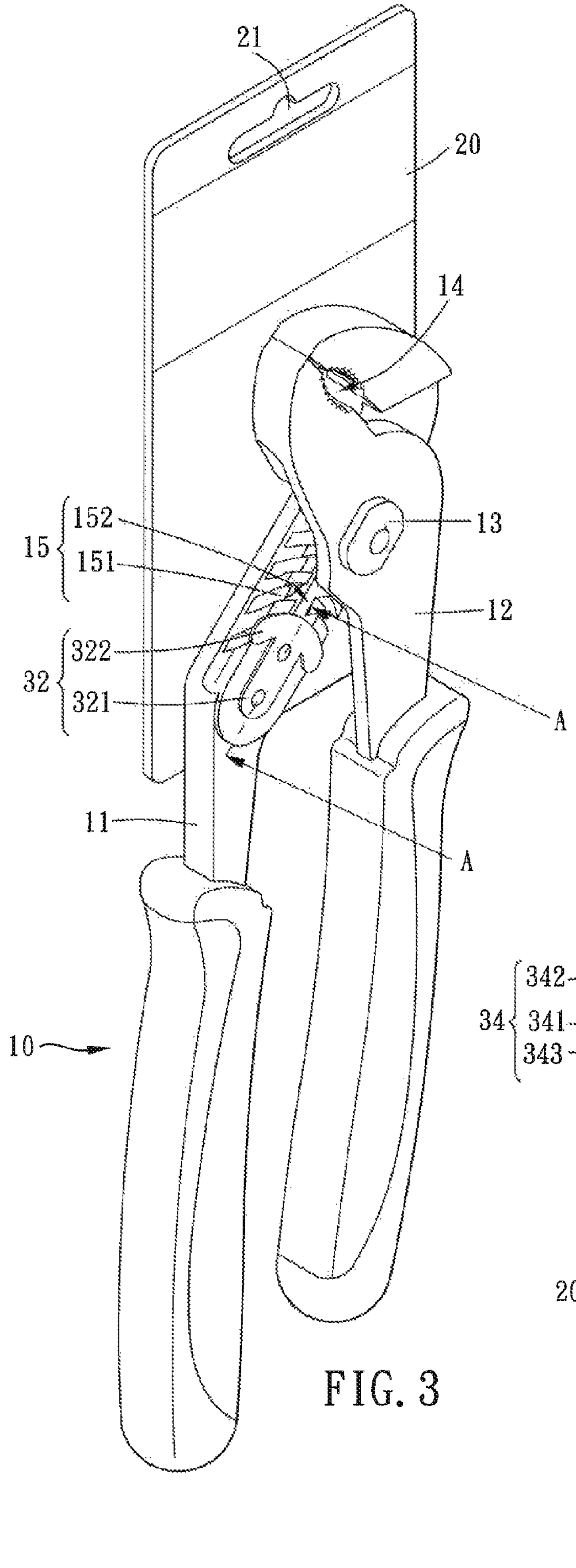
FIG. 3 is a perspective view of the first embodiment of the present invention for showing a pincer which is assembled.

FIG. 3 shows a first embodiment of the present invention. A hanging device is used to hang a pincer body 10 which is displayed. The pincer body 10 comprises a first clamp body 11, a second clamp body 12 and a connector 13. The first clamp body 11 and the second clamp body 12 define a clamping space 14 therebetween. The first clamp body 11 has an adjusting opening 15 opened thereon. The first clamp body 11 is slidably pivoted to the second clamp body 12 via the connector 13 controllably slidably disposed through the adjusting opening 15. The connector 13 passes through the second clamp body 12 and the adjusting opening 15 of the first clamp body 11 so as to connect the first clamp body 11 and the second clamp body 12. The connector 13 is slidable along the adjusting opening 15 of the first clamp body 11, so that the second clamp body 12 is slidable relative to the first clamp body 11 so as to adjust a size of the clamping space 14. The adjusting opening 15 has a plurality of curved portions 151 and a straight portion 152. The curved portions 151 are aligned in a row. A distance is defined between each two adjacent curved portions 151. The straight portion 152 passes through a center of each curved portion 151. Referring to FIGS. 1-3, the hanging device of the present invention comprises a hanging member 20 and a positioning member 30.

The hanging member 20 has a front side and a rear side. The hanging member 20 has a hanging hole 21, a through hole 22 and a sliding hole 23 opened thereon. A hook or a hanging pole passes through the hanging hole 21 (not shown) so as to hang the hanging member 20 on a wall or a display rack. The sliding hole 23 has two ends which are both round-shaped. The sliding hole 23 is inclinedly extended relative to a bottom of the hanging member 20, so that the sliding hole 23 is capsule-shaped. The hanging member 20 has two rods 24 extended from the front side thereof The hanging member 20 has an extruded ring 25 extruded form the rear side thereof (as shown in FIG. 3B). Two ends of the sliding hole 23 define an imaginational. line. The two rods 24 are aligned on the imaginational line. A distance is defined between the two rods 24. The through hole 22 is located between the two rods 24 on the imaginational line. The extruded ring 25 encloses the through hole 22.

The positioning member 30 has a base 31 and a positioning portion 32. The positioning member 30 has two through openings 33. The two through openings 33 are both opened from the base 31 to the positioning portion 32 therethrough. The base 31 has a main part 311 and a curved part 312. The curved part 312 is defined at one end of the main part 311. The main part 311 has a top portion and a bottom portion. The bottom portion of the main part 311 is assembled to the hanging member 20. The positioning portion 32 is assembled to the top portion of the main part 311. A positioning block 34 is extruded from the bottom portion of the main part 311. The positioning block 34 has an extruded part 341 and a smooth part 342. A ripped furrow 343 is opened from a top of the extruded part 341 to the smooth part 342. The positioning portion 32 has a straight part 321 and a head part 322. The straight part 321 is extended parallelly with the main part 311 of the base 31. The head part 322 is defined at one end of the straight part 321. The straight part 321 of the positioning portion 32 is assembled to the top portion of the main part 311. A width of the straight part 321 of the positioning portion 32 is longer than a width of the main part 311 of the base 31, and is longer than a width of the straight portion 152 of the adjusting opening 15. The head part 322 of the positioning portion 32 is round-shaped. The head part 322 has a center which is connected to one end of the straight part 321. The head part 322 of the positioning portion 32 is assembled at a top of the curved part 312 of the base 31. A shape of the head part 322 corresponds to the curved part 312. A width of the head part 322 is longer than a width of the curved part 312 of the base 31, and is longer than a width of the curved portions 151 of the adjusting opening 15.

Figure 3A:
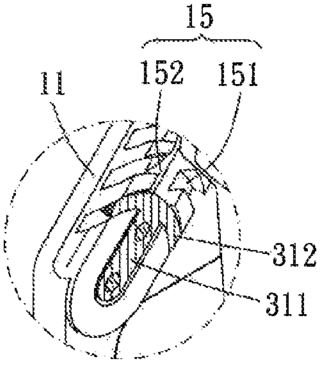
FIG. 3A is a partially enlarged view for showing a base which is assembled to an adjusting hole.
Figure 3B:
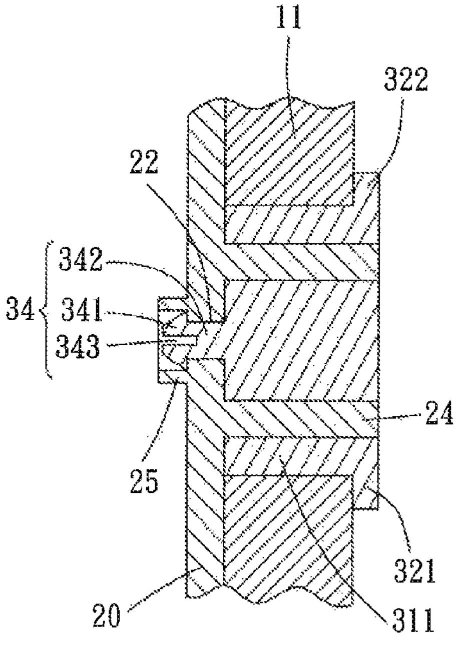
FIG. 3B is a cross-sectional view along line A-A in FIG. 3.

When a user wants to assemble the pincer body 10 to the hanging device of the present invention, the user inserts the main part 311 of the base 31 into the straight portion 152 of the adjusting opening 15, and inserts the curved part 312 of the base 31 into one curved portion 151 (as shown in FIG. 3A); the extruded part 341 of the positioning block 34 of the bottom portion of the main part 311 is inwardly compressed so as to smoothly pass through the through hole 22; the two rods 24 of the hanging member 20 are respectively inserted into the two through openings 33; after the extruded part 341 of the positioning block 34 passes through the through hole 22, the extruded part 341 recovers from said compressed states, so that the smooth part 342 is assembled in the through hole 22 and the extruded part 341 is exposed from the rear side of the hanging member 20 and engaged with the hanging member 20; as a result, the first clamp body 11 is locked between the positioning portion 32 and the hanging member 20 so as to be burglarproof, and the first clamp body 11 is still controllably slidable relative to the second clamp body 12 via movement of the connector 13 along the adjusting opening 15 and pivotable.

Figure 4:
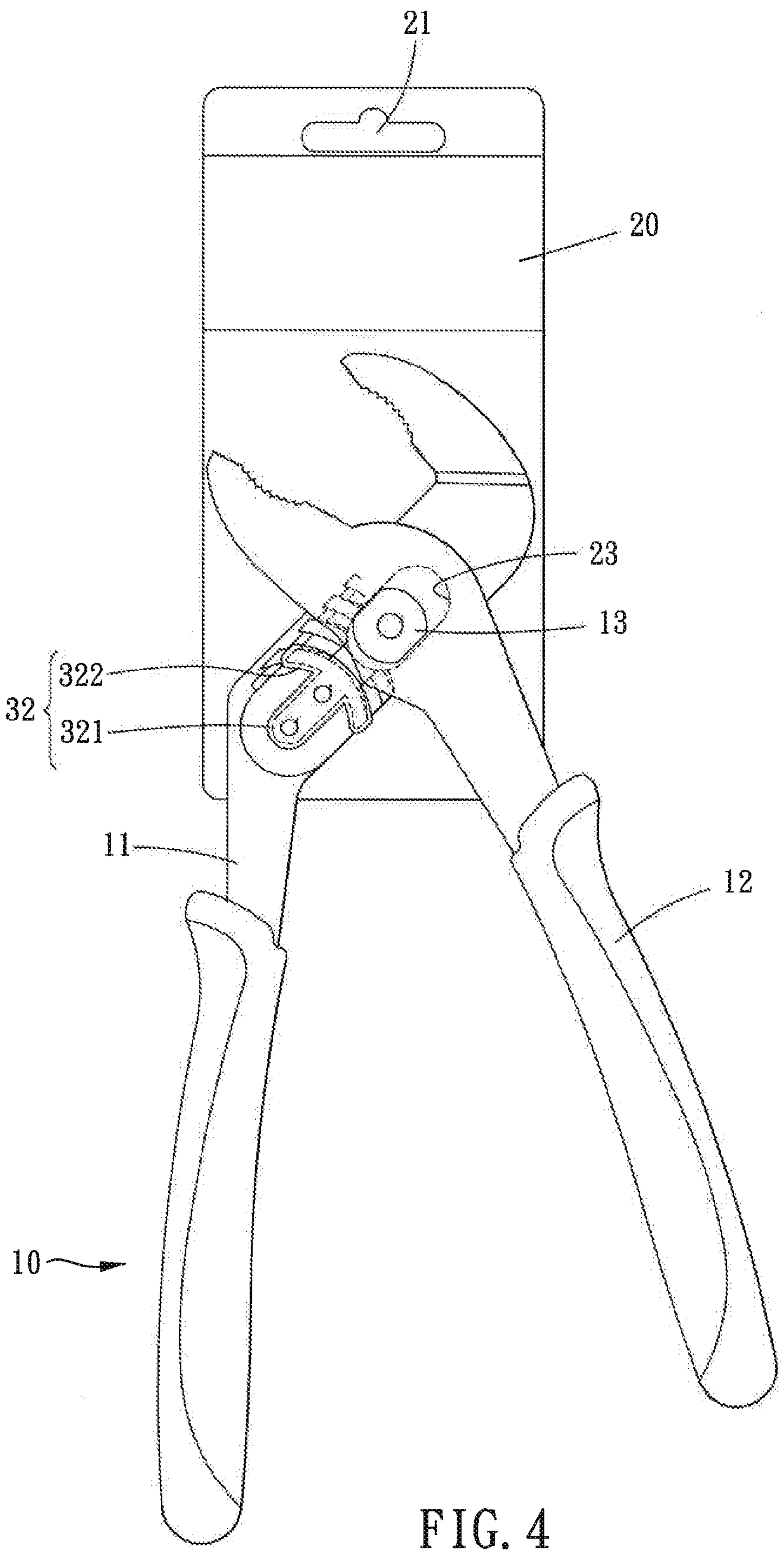
FIG. 4 is a side view of the first embodiment for showing the pincer in which a clamping space is adjustable.

Furthermore, the connector 13 passes through the sliding hole 23 and is slidable along the sliding hole 23 so that the second clamp body 12 is movable relative to the first clamp body 11 so as to adjust the size of the clamping space 14 (as shown in FIG. 4). The extruded part 341 defines an exposure distance form the rear side of the hanging member 20. The extruded ring 25 defines an extrusion distance form the rear side of the hanging member 20. The extrusion distance of the extruded ring 25 is longer than the exposure distance of the extruded part 341, or is equal to the exposure distance of the extruded part 341 (as shown in FIG. 3B), so that the extruded part 341 is completely protected by the extruded ring 25 to be prevented form being unexpectedly compressed by an outside force and being unexpectedly detached from the through hole 22 of the hanging member 20; therefore, the pincer body 10 is burglarproof via the present invention.

Figure 5:
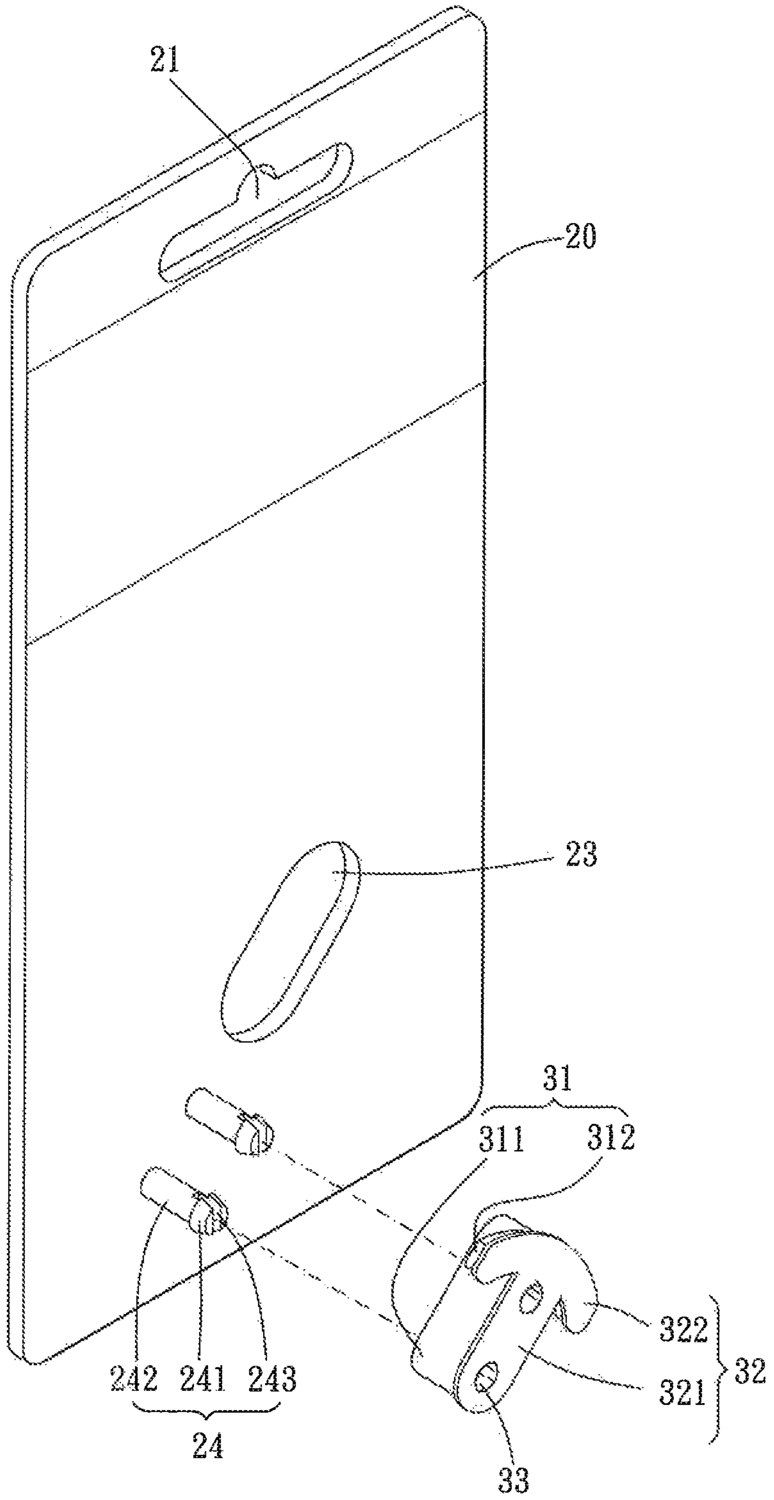
FIG. 5 is an exploded view of a second embodiment of the present invention.

FIG. 5 shows a second embodiment of the present invention. The two rods 24 of the hanging member 20 has an extruded portion 241 and a smooth portion 242. A ripped groove 243 is opened from a top of the extruded portion 241 to the smooth portion 242. When the positioning member 30 is assembled to the hanging member 20, the smooth portion 242 of each rod 24 is inserted into each corresponding through opening 33, and the extruded portion 241 of each rod 24 passes through each corresponding through opening 33, so that the extruded portion 241 of each rod 24 is exposed from the positioning portion 32 and is engaged with a top surface of the positioning portion 32.

Figure 6:
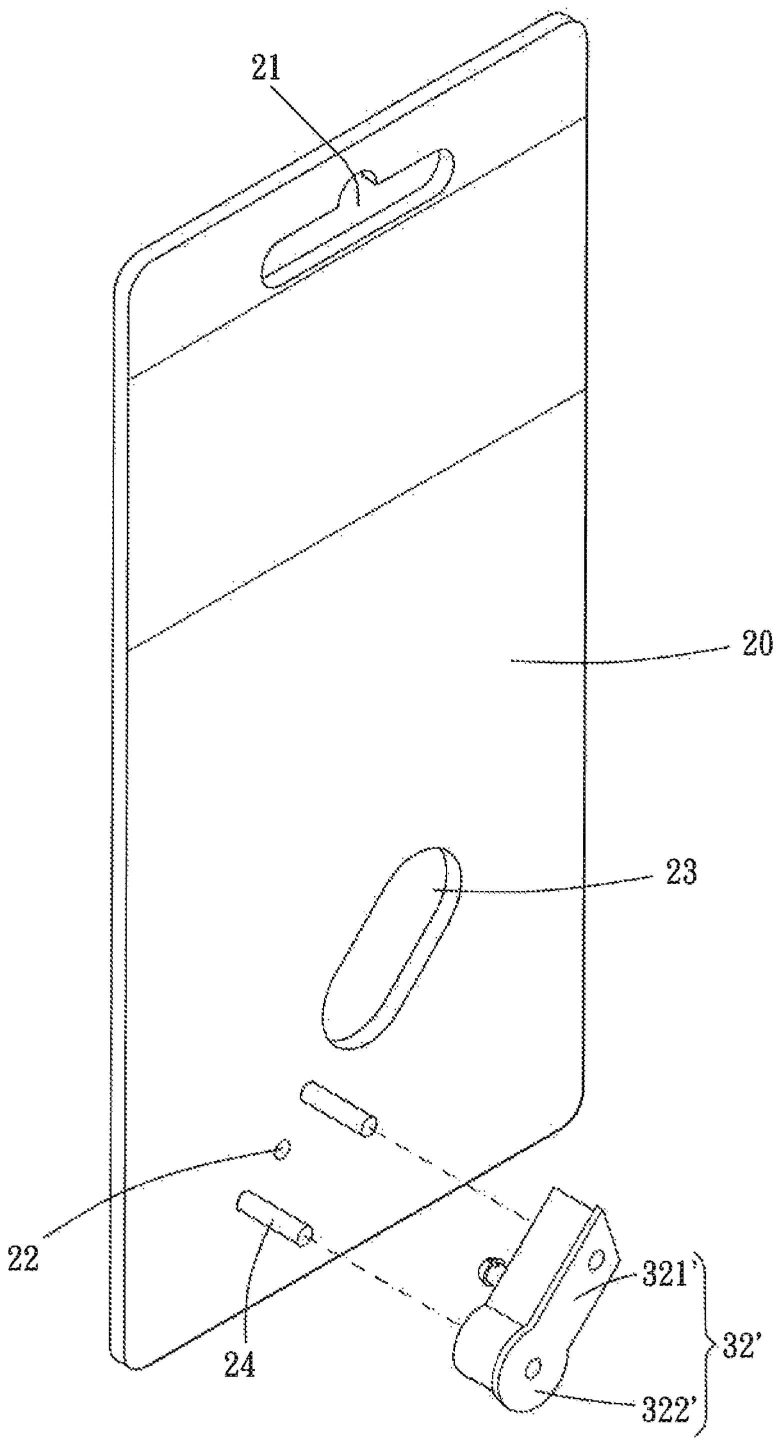
FIG. 6 is an exploded view of a third embodiment of the present invention.
Figure 7:
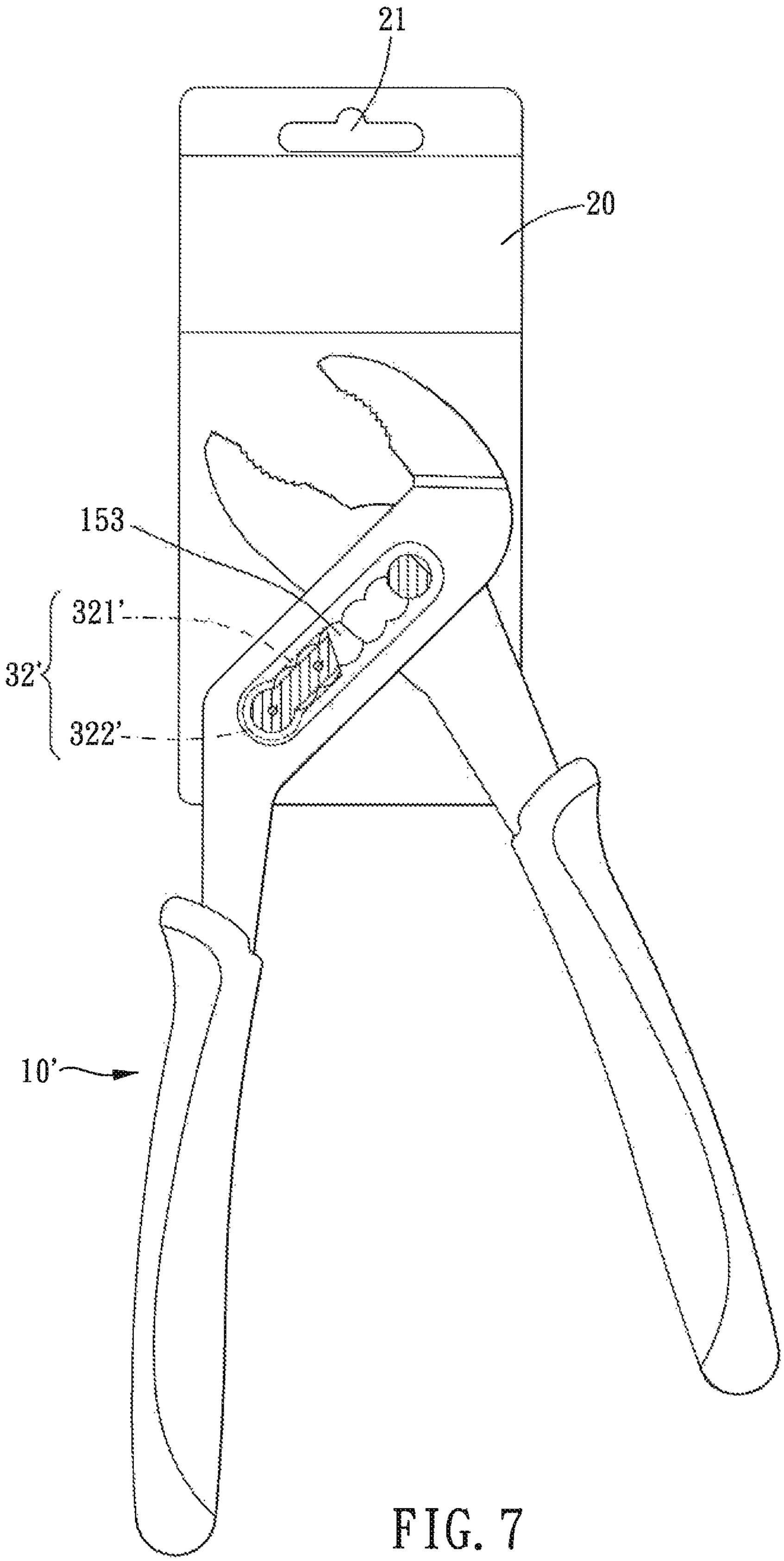
FIG. 7 is a side view of the third embodiment of the present invention for showing another pincer which is assembled.

FIGS. 6-7 show a third embodiment of the present invention. The third embodiment is used to hang a pincer body 10' which is displayed (only the differences between the pincer body 10' and the pincer body 10 would be further described.). The pincer body 10' has a first clamp body. The first clamp body has an adjusting opening. The adjusting opening has a plurality of round portions 153. The round portions 153 are strung and communicate with each other. A width of a straight part 321' of a positioning portion 32' is longer than a width of each stringing site of each two adjacent round portions 153. A head part 322' of the positioning portion 32' is round-shaped. A width of the head part 322' of the positioning portion 32' is longer than a diameter of each round portion 153.

All in all, the structure of the positioning member 30 of the present invention is simple and costs down; the positioning member 30 makes the pincer body 10 or 10' burglarproof; the present invention is easy to assemble; the present invention just occupies a slight space.

Moreover, when the pincer body 10 or 10' is assembled to the present invention, the user still can adjust the size of the clamping space 14 and try an operation feel.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hanging device used to hang a pincer body which is displayed, the pincer body comprising a first clamp body and a second clamp body, the first clamp body having an adjusting opening opened thereon, the first clamp body being slidably pivoted to the second clamp body via a connector controllably slidably disposed through the adjusting opening, the hanging device comprising:

a hanging member having a hanging hole; and a positioning member having a base and a positioning portion, the base having a top portion and a bottom portion, the bottom portion of the base assembled to the hanging member, a width of the positioning portion being longer than a width of the base and being longer than a width of the adjusting opening of the first clamp body;

wherein, when the base is inserted into the adjusting opening of the first clamp body, the positioning portion is assembled to a top of the base so that the first clamp body is locked between the positioning portion and the hanging member, and the first clamp body is controllably slidable relative to the second clamp body via movement of the connector along the adjusting opening and pivotable;

wherein the positioning portion has a straight part and a head part; the straight part is extended in parallel with the base; the head part is defined at one end of the straight part;

wherein the adjusting opening has a plurality of curved portions and a straight portion; the curved portions are aligned in a row; a distance is defined between each two adjacent curved portions; the straight portion passing through a center of each curved portion; the head part of the positioning portion is round-shaped; the head part has a center which is connected to one end of the straight part; a width of the straight part of the positioning portion is longer than a width of the straight portion of the adjusting opening; a width of the head part is longer than a width of the curved portions of the adjusting opening;

wherein the base has a main part and a curved part; the main part of the base is inserted into the straight portion of the adjusting opening, and the curved part of the base is inserted into one curved portion; the straight part of the positioning portion is assembled to the top portion of the main part a width of the straight part of the positioning portion is longer than a width of the main part of the base; the head part of the positioning portion is assembled at a top of the curved part of the base; a shape of the head part corresponds to the curved part; a width of the head part is longer than a width of the curved part of the base.

2. The hanging device as claimed in claim 1, wherein the adjusting opening has a plurality of round portions; the round portions are strung and communicate with each other; a width of the straight part of the positioning portion is longer than a width of each stringing site of each two adjacent round portions; a head part of the positioning portion is round-shaped; a width of the head part of the positioning portion is longer than a diameter of each round portion.

3. The hanging device as claimed in claim 1, wherein the hanging member has a sliding hole opened thereon; the connector passes through the second clamp body, the adjusting opening of the first clamp body and the sliding hole, and is slidable along the adjusting opening the sliding hole, so that the second clamp body is movable relative to the first clamp body.

4. A hanging device used to hang a pincer body which is displayed, the pincer body comprising a first clamp body and a second clamp body, the first clamp body having an adjusting opening thereon, the first clamp body being slidably pivoted to the second clamp body via a connector controllably slidably disposed through the adjusting opening, the hanging device comprising:

a hanging member having a hanging hole; and a positioning member having a base and a positioning portion, the base having a top portion and a bottom portion, the bottom portion of the base assembled to the hanging member, a width of the positioning portion being longer than a width of the base and being longer than a width of the adjusting opening of the first clamp body;

wherein when the base is inserted into the adjusting opening of the first clam body the positioning portion is assembled to a top of the base so that the first clamp body is locked between the positioning portion and the hanging member, and the first clamp body is controllably slidable relative to the second clamp body via movement of the connector along the adjusting opening and pivotable;

wherein the hanging member has a through hole opened thereon; a positioning block is extruded from the bottom portion of the base; the positioning block passes through the through hole and is engaged with the hanging member;

wherein the positioning block has an extruded part and a smooth part; the smooth part is assembled in the through hole and the extruded part is exposed from the rear side of the hanging member; the hanging member has an extruded ring; the extruded ring encloses the through hole; the extruded ring extruded form the rear side of the hanging member; the extruded part defines an exposure distance form the rear side of the hanging member; the extruded ring defines an extrusion distance form the rear side of the hanging member; the extrusion distance of the extruded ring is longer than the exposure distance of the extruded part, or is equal to the exposure distance of the extruded part.

5. A hanging device used to hang a pincer body which is displayed, the pincer body comprising a first clamp body and a second clamp body, the first clamp body having an adjusting opening opened thereon, the first clamp body being slidably pivoted to the second clamp body via a connector controllably slidably disposed through the adjusting opening, the hanging device comprising:

a hanging member having a hanging hole; and a positioning member having a base and a positioning portion, the base having a top portion and a bottom portion the bottom portion of the base assembled to the hanging member, a width of the positioning portion being longer than a width of the base and being longer than a width of the adjusting opening of the first clamp body;

wherein, when the base is inserted into the adjusting opening of the first clamp body, the positioning portion is assembled to a top of the base so that the first clamp body is locked between the positioning portion and the hanging member, and the first clamp body is controllably slidable relative to the second clamp body via movement of the connector along the adjusting opening and pivotable;

wherein the hanging member has two rods extended therefrom; the two rods of the hanging member are both inserted into the positioning member;

wherein the two rods of the hanging member has an extruded portion and a smooth portion; the positioning member has two through openings; the two through openings are both opened from the base to the positioning portion therethrough; the smooth portion of each rod is inserted into each corresponding through opening and the extruded portion of each rod passes through each corresponding through opening; the extruded portion of each rod is exposed from the positioning portion and is engaged with a top surface of the positioning portion.

* * * * *